United States Patent
Martiška et al.

(10) Patent No.: US 11,719,403 B2
(45) Date of Patent: Aug. 8, 2023

(54) PRIMARY OPTICS FOR MOTORCYCLE HEADLAMP

(71) Applicant: ZKW Group GmbH, Wieselburg (AT)

(72) Inventors: Matej Martiška, Lovce (SK); Anton Kokoška, Zázrivá (SK); Jaroslav Kyselica, Dezerice (SK)

(73) Assignee: ZKW Group GmbH, Wieselburg (AT)

( * ) Notice: Subject to any disclaimer, the term of this patent is extended or adjusted under 35 U.S.C. 154(b) by 0 days.

(21) Appl. No.: 18/082,753

(22) Filed: Dec. 16, 2022

(65) Prior Publication Data
US 2023/0194063 A1 Jun. 22, 2023

(30) Foreign Application Priority Data
Dec. 17, 2021 (EP) ..................................... 21215517

(51) Int. Cl.
*F21S 41/24* (2018.01)
*B62J 6/026* (2020.01)
(Continued)

(52) U.S. Cl.
CPC .............. *F21S 41/24* (2018.01); *B62J 6/026* (2020.02); *F21W 2102/20* (2018.01); *F21W 2107/17* (2018.01)

(58) Field of Classification Search
CPC ...... F21S 41/143; F21S 41/153; F21S 41/151; F21S 41/24; B62J 6/023
See application file for complete search history.

(56) References Cited

U.S. PATENT DOCUMENTS 10,677,408 B2 * 6/2020 Renaud ................. F21S 41/265
2007/0195541 A1 * 8/2007 Froehlich ............. F21S 41/275
362/459

(Continued)

FOREIGN PATENT DOCUMENTS

DE 102018209061 A1 12/2019
DE 102020202923 A1 9/2021
(Continued)

OTHER PUBLICATIONS

Search Report for European Patent Application No. 21215517.0 dated May 19, 2022 (9 pages).

*Primary Examiner* — Matthew J. Peerce
(74) *Attorney, Agent, or Firm* — Eversheds Sutherland (US) LLP

(57) ABSTRACT

A primary optics for a motorcycle headlamp, wherein the primary optics is a non-imaging primary optics configured to irradiate a segmented light distribution in front of the primary optics, wherein the primary optics includes a plurality of light guiding elements for forming a predetermined segmented light distribution from light of light sources in a main direction. Each light guiding element has a light input surface and a common light output surface, wherein the light guiding elements are arranged in groups, wherein each group includes at least two light guiding elements arranged in juxtaposition along a straight arrangement line orthogonal to the main direction. The light segments generated by the light guiding elements of a group are irradiated in juxtaposition along a straight irradiation line corresponding to and parallel to respective straight arrangement line of the respective group. The common light output surface includes a homogenization structure, which is formed of a plurality of grooves, each of which extends along an extension line transverse to the straight arrangement line of each group of light guiding elements, wherein the groove has a constant (Continued)

radius in a cross-section orthogonal to the extension line along the extension line, and wherein the grooves are arranged with respect to each other such that the extension lines of the grooves are parallel to each other.

15 Claims, 2 Drawing Sheets

(51) Int. Cl.
*F21W 102/20* (2018.01)
*F21W 107/17* (2018.01)

(56) References Cited

U.S. PATENT DOCUMENTS

2015/0226395 A1\* 8/2015 Taudt ................ F21S 41/25
362/511
2018/0328562 A1 11/2018 Taudt et al.

FOREIGN PATENT DOCUMENTS

WO 2017185118 A1 11/2017
WO WO-2017185118 A1 \* 11/2017 ............ F21S 41/143

\* cited by examiner

PRIMARY OPTICS FOR MOTORCYCLE HEADLAMP

CROSS-REFERENCE TO RELATED APPLICATIONS

This application claims priority to European Patent Application No. 21215517.0, filed Dec. 17, 2021, which is incorporated herein by reference.

FIELD OF THE INVENTION AND DESCRIPTION OF PRIOR ART

The invention relates to a primary optics for a motorcycle headlamp, the primary optics is a non-imaging primary optics configured to irradiate a segmented light distribution in front of the primary optics, wherein the primary optics comprises:
 a base body, and
 a plurality of light guiding elements protruding from the base body for forming a predetermined segmented light distribution from light of light sources in a main direction,
wherein each light guiding element has a light input surface, into which light of the light sources can be coupled into the light guiding element, and a common light output surface for irradiating light received by the light guide elements, wherein each light guiding element is configured to contribute in generating of a respective light segment of the segmented light distribution,
wherein the light guiding elements are arranged in groups, wherein each group comprises at least two light guiding elements arranged in juxtaposition along a straight arrangement line orthogonal to the main direction, wherein the light segments generated by the light guiding elements of a group are irradiated in juxtaposition along a straight irradiation line corresponding to and parallel to respective straight arrangement line of the respective group.

The invention also relates to an illumination device comprising a primary optics according to the invention, a plurality of light sources, at least one light source being associated with a respective light input surface of a light guide element, and a projection lens system, which is configured to receive the light emitted from the common light output surface of the primary optics and to project the segmented light distribution in front of the illuminating device.

The invention also relates to a motorcycle headlamp comprising at least one illumination device according to the invention or at least one primary optics according to the invention.

Primary optics in illumination devices that allow an irradiation of a segmented light pattern are known from prior art. For instance, document AT 513341 A1 discloses an illumination device for radiation of a segmented light pattern. This illumination device is designed for use in cars. Contrary to motorcycles, vehicle headlamp for car is usually less constrained by size requirements and do not need to have any adaptions for lateral inclinations of a car. Usually, the lateral inclinations of cars are minor.

Due to limited space headlamps for motorcycles often have a lower number of segments (in particular columns) when segmenting a light pattern. Consequently, each segment covers a wider spatial angle. Having a wider spatial angle for a given segments leads to problems regarding visible differences of the light intensity in the light pattern. In detail, darker vertical gaps can be seen in areas wherein segments are adjacent to each other.

SUMMARY OF THE INVENTION

It is an object of the present invention to provide a primary optics for a motorcycle headlamp that offers a light distribution having an increased homogeneity.

To achieve this object, the common light output surface comprises a homogenization structure configured to homogenize the light distribution of light segments irradiated along the straight irradiation line, wherein the homogenization structure is formed of a plurality of grooves, each of which extends along an extension line transverse to the straight arrangement line of each group of light guiding elements, wherein the groove having a constant radius in a cross-section orthogonal to the extension line along the extension line, and wherein the grooves being arranged with respect to each other in such a way that the extension lines of the grooves are parallel to each other.

A motorcycle is typically a two-wheeled single-track motor vehicle, but generally speaking a two-wheeled or three-wheeled motor vehicle that is designed to incline/bank along its longitudinal axis when cornering. Possible bank angles of 45° are common.

Each light guide element of the primary optics is assigned to a specific segment of the light distribution pattern that can be irradiated by the primary optics or an illumination device with the primary optics, wherein neighboring light guide elements are assigned to neighboring segments in the light distribution.

Preferably, each row or group of the light guide elements of the primary optics including the light sources assigned to these rows or groups of rows can be activated and deactivated independently of each other, wherein the primary optics or illumination device with the primary optics is configured to be controlled based on a measured bank angle of the motorcycle, wherein the rows are tilted with regard to another and activation and deactivation of the rows or groups is performed based on the measured bank angle of the motorcycle, in particular in order to add additional light irradiation into an area of a low beam distribution. This allows for a maximum resolution of the illumination device while optimizing the behavior of the illumination device when cornering, thus avoiding glaring while maintaining optimal road illumination. Due to inclination of the motorcycle some of the light segments that are devoted to the high beam light distribution in an upright position will be irradiating into the low beam area due to the inclination into a lower position and will provide an adapted cut-off up to the changing horizon—depending on the direction and extent of the inclination. Hence, the low beam module can be supported by the high beam module by selective activation of segments, in particular rows of the illumination device. A larger number of rows improves the adaptation of the dipped headlamp's light pattern when cornering.

Preferably, the primary optics or the illumination device with the primary optics is configured to enable the irradiation of a high beam light distribution. When the motorcycle runs straight ahead, typically in an upright position, a high beam light distribution can be radiated. When the motorcycle leans into curves for instance only one side of the one/two/three rows or groups of light guide elements (like slices of pizza) can be activated in dependence of the bank angle. This is where the "homogenization structure" according to the invention is in particular useful: In contrast to sharp borders of a segmented high-beam light distribution, here the light segments of the singe light guide elements will smoothly overlap from the center to periphery along a radial direction. When cornering, a homogeneous low-beam distribution is generated, and the cut-off line is aligned with the horizon at different bank angles.

Advantageously, the extension lines are linear axes.

Advantageously, the extension lines at least partially have a curvature in the direction of the main direction. Preferably, the curvature follows the Petzval surface of the projection lens system.

Advantageously, each groove having the same radius.

Advantageously, the radius is between 0.1 mm and 0.5 mm, preferably between 0.175 mm and 0.5 mm, preferably 0.35 mm.

Advantageously, each groove following a half circle in a cross-section orthogonal to the extension line along the extension line.

Advantageously, the primary optics is made of silicon.

Advantageously, the primary optics is made of transparent polycarbonate material.

Advantageously, the primary optics is created as a single pieced component by way of molding, in particular injection molding.

The object of the invention is also be achieved by an illumination device comprising a primary optics according to the invention, a plurality of light sources, at least one light source being associated with a respective light input surface of a light guide element, and a projection lens system, which is configured to receive the light emitted from the common light output surface of the primary optics and to project the segmented light distribution in front of the illuminating device.

Advantageously, the projection lens system comprising at least one projections lens, preferably exactly one projection lens.

Preferably, the projection lens system has an optical axis and a Petzval area, wherein the primary optics and the projection lens system are arranged to each other in such a way that the common light output surface of the primary optics is positioned in the Petzval area of the projection lens system. Preferably, the projection lens system comprises an achromatic doublet for reducing chromatic aberrations.

Preferably, the primary optics and the projection lens system are coaxially arranged with the main beam direction of the illumination device.

Preferably, each extension line lies in an extension plane, wherein the grooves of the homogenization structure are arranged in a way, that the extension plane of each groove is parallel to each other.

Preferably, the extension planes are parallel to the vertical mirror plane. Because of this straight orientation of the grooves, the homogeneity of the segmented rows or groups is positively affected due to overlapping effects in horizontal orientation in addition to the overlapping along the straight irradiation line in radial direction.

Preferably, the extension planes are vertical seen in a correct installed state of the primary optics in a motorcycle, wherein the motorcycle is in an upright position.

The effect of this features is that the segments of light distributions are even more homogenized along the straight irradiation line.

The object of the invention is also be achieved by a motorcycle headlamp comprising at least one illumination device according to the invention or at least one primary optics according to the invention.

BRIEF DESCRIPTION OF THE DRAWINGS

In the following, in order to further demonstrate the present invention, illustrative and non-restrictive embodiments are discussed, as shown in the drawings, which show.

DETAILED DESCRIPTION OF EMBODIMENTS OF THE INVENTION

Figure 1:
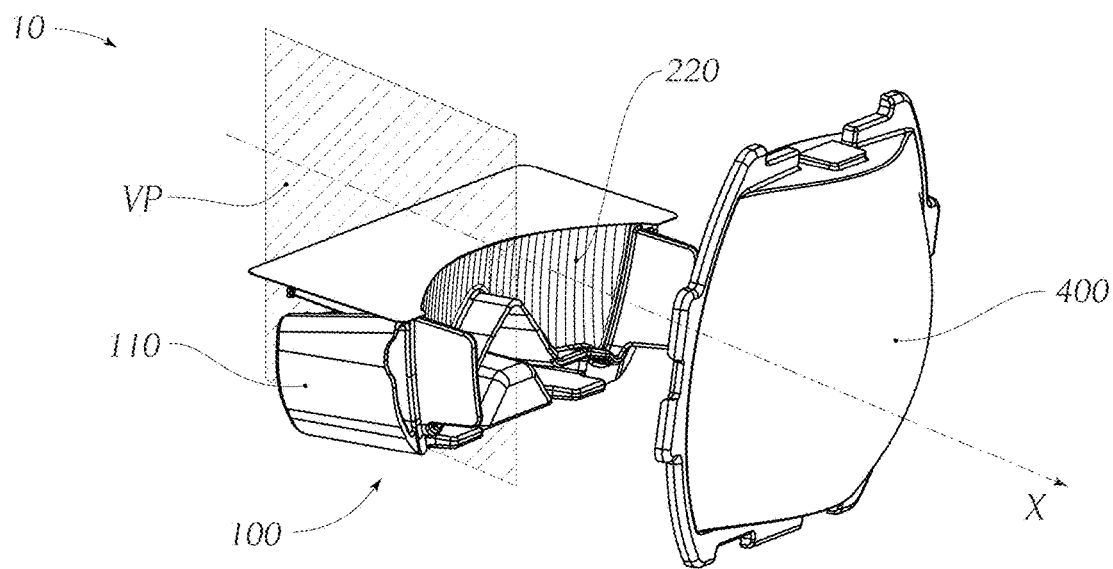
FIG. 1 an example of an illumination device comprising a primary optics with light guide elements, and a plurality of light sources, at least one light source being associated with a respective light input surface of a light guide element, and a projection lens system, which is configured to receive the light emitted from a common light output surface of the primary optics and to project a segmented light distribution in front of the illuminating device, FIG. 2 a back view of the primary optics of illumination device in FIG. 1, FIG. 3 a front view of the primary optics in FIGS. 1 and 2, wherein the common light output surface comprises a homogenization structure, wherein the homogenization structure is built as a plurality of parallel grooves, FIG. 4 a top view of the primary optics of FIGS. 1, 2 and 3, and irradiated light segments generated by a first group of light guiding elements, FIG. 5 a perspective detailed view of the grooves of the common light output surface of the primary optics, FIG. 6 a schematic perspective view of a single groove of the homogenization structure, FIG. 7A an exemplary segmented light distribution, wherein the light distribution comprises light segmented generated by the first group of light guiding elements, wherein the segmented light distribution is irradiated by a primary optics according to the invention, and FIG. 7B an exemplary segmented light distribution, wherein the light distribution comprises light segmented generated by the first group of light guiding elements, wherein the segmented light distribution is irradiated by a primary optics not according to the invention without a homogenization structure.

FIG. 1 shows an illumination device 10 for a motorcycle headlamp comprising a primary optics 100, which is a non-imaging primary optics configured to irradiate a segmented light distribution, wherein the primary optics 100 comprises a base body 110, and plurality of light guiding elements 200 protruding from the base body 110 for channeling light and forming a predetermined segmented light distribution LD1' from light of light sources 50 in a main direction X.

The illumination device 10 shown in the figures is configured to irradiate or project a high beam light distribution, but the illumination device 10 may also comprise an additional low beam module for irradiating or projecting a low beam light distribution.

Figure 2:
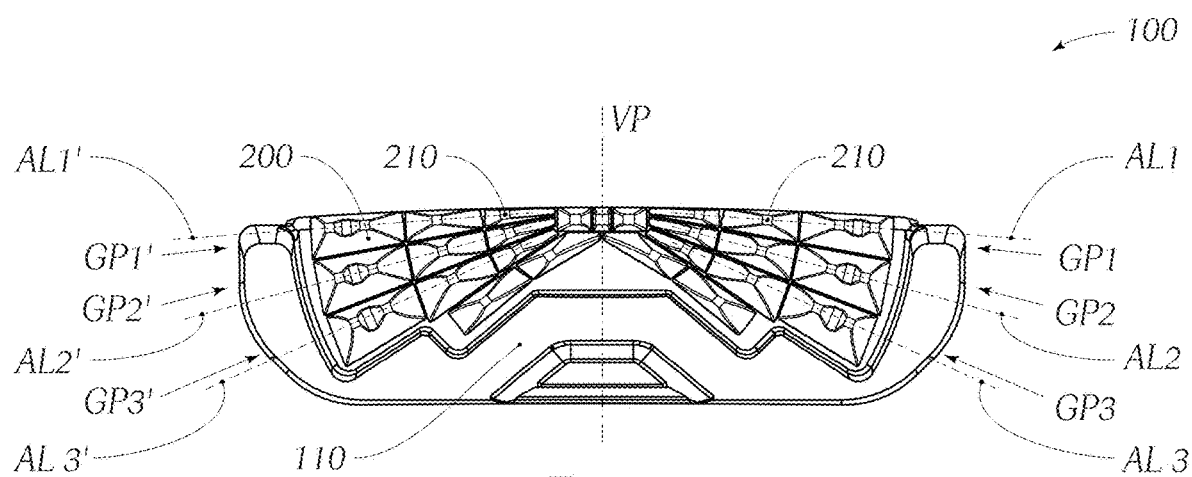
Figure 3:
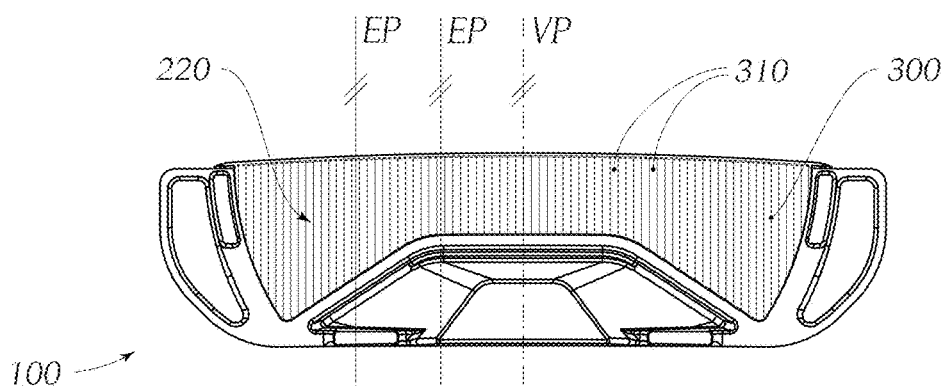

Each light guiding element 200 has a light input surface 210, into which light of the light sources 50 can be coupled into the light guiding element 200, and a common light output surface 220 for irradiating light received by the light guide elements 200, wherein each light guiding element 200 is configured to contribute in generating of a respective light segment of the segmented light distribution, as can be seen in more detail in FIG. 2 and FIG. 3.

The primary optics 100 is made of silicon but can also be made of transparent polycarbonate material (PC), wherein the primary optics 100 is created as a single pieced component by way of molding, in particular injection molding.

The illumination device 10 comprises a plurality of light sources 50, at least one light source 50 being associated with a respective light input surface 210 of a light guide element 200, and a projection lens system 400, which is configured to receive the light emitted from the common light output surface 220 of the primary optics 100 and to project a segmented light distribution LD1 in front of the illuminating device 10.

As shown in FIG. 2, the light guiding elements 200 are arranged in groups GP1, GP2, GP3, wherein the groups are mirrored along a vertical plane VP, as can be seen in FIG. 2, wherein the vertical plane VP is parallel to the main direction X. Groups GP1', GP2', GP3' in FIG. 2 are the mirrored groups of groups GP1, GP2, GP3. Each group GP1, GP2, GP3 comprises in the embodiment in the figure, three light guiding elements 200 arranged in juxtaposition along a straight arrangement line AL1, AL2, AL3 orthogonal to the main direction X (the same applies for the mirrored groups GP1', GP2', GP3'), wherein the light segments generated by the light guiding elements 200 of a group are irradiated in juxtaposition along a straight irradiation line IL corresponding to and parallel to respective straight arrangement line of the respective group. Referring hereto, FIG. 7A and FIG. 7B show a generated segmented light distribution LD1, wherein the light segments LS1, LS2, LS3 are generated by the light guiding elements of a first mirrored group GP1'.

The common light output surface 220 comprises a homogenization structure 300 configured to homogenize the light distribution LD1 of light segments LS1, LS2, LS3 irradiated along the straight irradiation line IL, wherein the homogenization structure 300 is formed of a plurality of grooves 310, each of which extends along an extension line EL transverse to the straight arrangement line AU, AL2, AL3 of each group GP1, GP2, GP3 of light guiding elements 200, wherein the groove 310 having a constant radius R in a cross-section orthogonal to the extension line EL along the extension line EL, and wherein the grooves 310 being arranged with respect to each other in such a way that the extension lines EL of the grooves 310 are parallel to each other. Each groove 310 having the same radius R, wherein the radius R is between 0.1 mm and 0.5 mm, preferably between 0.175 mm and 0.5 mm, preferably 0.35 mm.

As can be seen for example in FIG. 3, each extension line EL lies in an extension plane EP, wherein the grooves 310 of the homogenization structure 300 are arranged in a way, that the extension plane EP of each groove is parallel to each other. Moreover, each extension plane EP is parallel to the vertical plane VP.

Figures 7A, 7B:
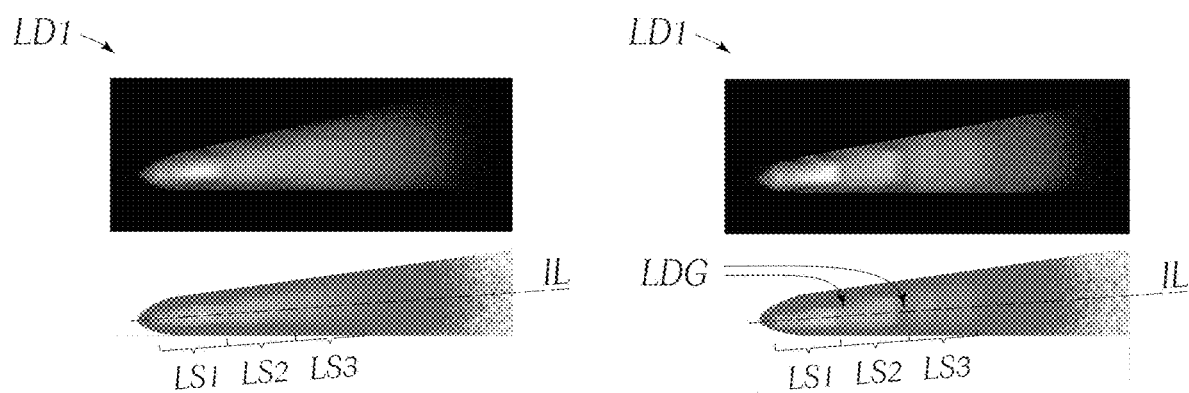

The abovementioned FIG. 7A shows a generated segmented light distribution with a homogenization structure 300, and FIG. 7B shows a generated segmented light distribution without a homogenization structure 300.

Figure 4:
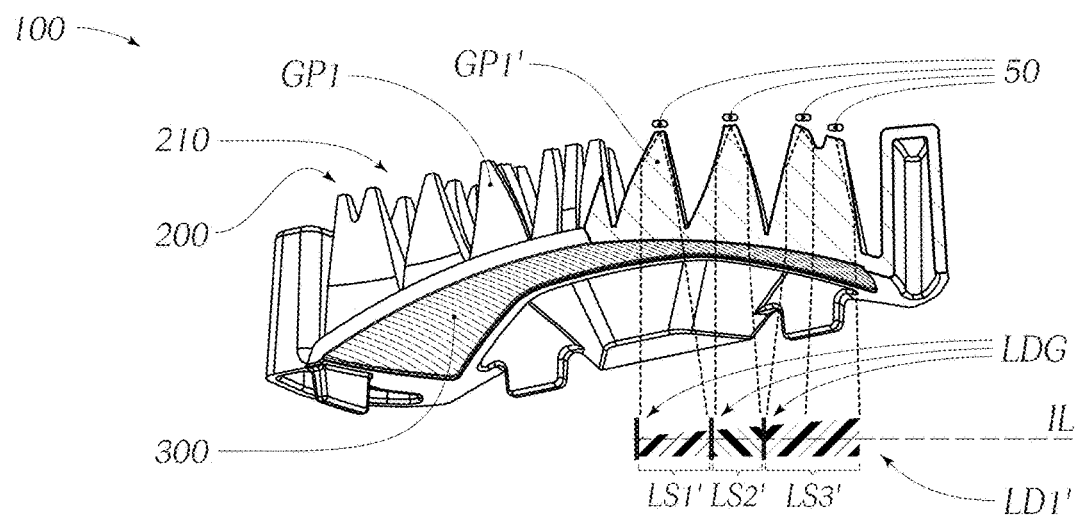

As can be seen in FIG. 4, which shows a top view of the primary optics 100 and a schematic illustrated segmented light distribution with light segments LS1', LS2', LS3', between adjacent light segments LS1', LS2', LS3' are indicated light distribution gaps LDG (also be seen in FIG. 7B as gaps LDG). These light distribution gaps LDG are irradiated with light due to the homogenization structure 300, so that light distribution of light segments LS1', LS2', LS3' are homogenized along the straight irradiation line IL. It should be noted, that the shown light distribution LD1' refers to an intermediate image generated by first mirrored group GP1' at the common light output surface 220 of the primary optics 100.

Figures 5, 6:
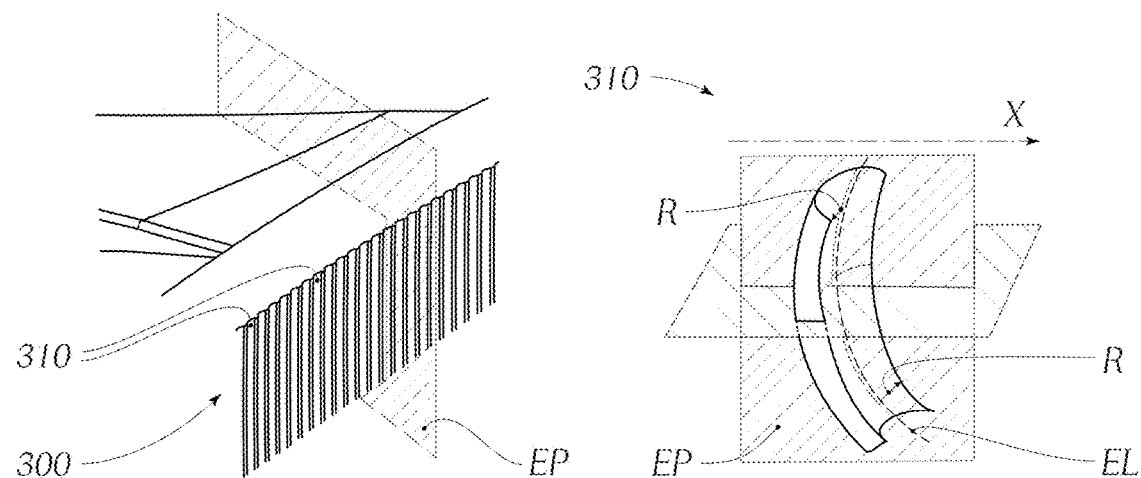

As can be seen in FIG. 3 and FIG. 5, the grooves 310 of the homogenization structure 300 are parallel to each other, wherein the extension lines EL are linear axes.

It is also possible that the extension lines EL have at least partially a curvature in the direction of the main direction X, as indicated in FIG. 6. It is also possible that each groove 310 following a half circle in a cross-section orthogonal to the extension line EL along the extension line EL, also indicated in FIG. 6.

Further, the common light output surface 220 following substantially a virtual curved surface, which curved surface can follow the Petzval surface of the projection lens system 400. In the same manner as the common light output surface 220, the grooves 310 and their respective extension lines EL follow the virtual curved surface.

LIST OF REFERENCE SIGNS

Illumination device . . . 10
Light source . . . 50
Primary optics . . . 100
Base body . . . 110
Light guiding elements . . . 200
Light input surface . . . 210
Common light output surface . . . 220
Homogenization structure . . . 300
Grooves . . . 310
Projection lens system . . . 400
Arrangement line . . . AL1, AL2, AL3; AL1', AL2', AL3'
Extension line . . . EL
Irradiation line . . . IL
Group . . . GP1, GP2, GP3; GP1', GP2', GP3'
Segmented light distribution . . . LD1; LD1'
Light segment . . . LS1, LS2, LS3; LS1', LS2', LS3'
Vertical plane . . . VP
Extension plane . . . EP
Radius . . . R
Main direction . . . X

The invention claimed is:

1. A primary optics (100) for a motorcycle headlamp, the primary optics (100) is a non-imaging primary optics configured to irradiate a segmented light distribution (LD1) in front of the primary optics (100), wherein the primary optics (100) comprises:

a base body (110); and
a plurality of light guiding elements (200) protruding from the base body (110) for forming a predetermined segmented light distribution (LD1) from light of light sources (50) in a main direction (X),
wherein each light guiding element (200) has a light input surface (210), into which light of the light sources (50) can be coupled into the light guiding element (200), and a common light output surface (220) for irradiating light received by the light guide elements (200), wherein each light guiding element (200) is configured to contribute in generating of a respective light segment (LS1, LS2, LS3) of the segmented light distribution (LD1),
wherein the light guiding elements (200) are arranged in groups (GP1, GP2, GP3), wherein each group (GP1, GP2, GP3) comprises at least two light guiding elements (200) arranged in juxtaposition along a straight arrangement line (AL1, AL2, AL3) orthogonal to the main direction (X), wherein the light segments (LS1, LS2, LS3) generated by the light guiding elements (200) of a group (GP1) are irradiated in juxtaposition along a straight irradiation line (IL) corresponding to and parallel to respective straight arrangement line (AL1) of the respective group (GP1), wherein the common light output surface (220) comprises a homogenization structure (300) configured to homogenize the light distribution (LD1) of light segments (LS1, LS2, LS3) irradiated along the straight irradiation line (IL), wherein the homogenization structure (300) is formed of a plurality of grooves (310), each of which extends along an extension line (EL) transverse to the straight arrangement line (AL1, AL2, AL3) of each group (GP1, GP2, GP3) of light guiding elements (200), wherein the groove (310) having a constant radius (R) in a cross-section orthogonal to the extension line (EL) along the extension line (EL), and wherein the grooves (310) are arranged with respect to each other in such a way that the extension lines (EL) of the grooves (310) are parallel to each other.

2. The primary optics according to claim 1, wherein the extension lines (EL) are linear axes.

3. The primary optics according to claim 1, wherein the extension lines (EL) at least partially have a curvature in the direction of the main direction (X).

4. The primary optics according to claim 1, wherein each groove (310) has the same radius (R).

5. The primary optics according to claim 1, wherein the radius (R) is between 0.1 mm and 0.5 mm.

6. The primary optics according to claim 1, wherein the radius (R) is between 0.175 mm and 0.5 mm.

7. The primary optics according to claim 1, wherein the radius (R) is 0.35 mm.

8. The primary optics according to claim 1, wherein each groove (310) follows a half circle in a cross-section orthogonal to the extension line (EL) along the extension line (EL).

9. The primary optics according to claim 1, wherein the primary optics (100) is made of silicon.

10. The primary optics according to claim 1, wherein the primary optics (100) is made of transparent polycarbonate material.

11. The primary optics according to claim 1, wherein the primary optics (100) is created as a single pieced component by way of molding, in particular injection molding.

12. The primary optics according to claim 1, wherein each extension line (EL) lies in an extension plane (EP), wherein the grooves (310) of the homogenization structure (300) are arranged in a way, that the extension plane (EP) of each groove (310) is parallel to each other.

13. An illumination device (10) comprising:
a primary optics (100) according to claim 1;
a plurality of light sources (50), at least one light source (50) being associated with a respective light input surface (210) of a light guide element (200); and
a projection lens system (400), which is configured to receive the light emitted from the common light output surface (220) of the primary optics (100) and to project the segmented light distribution (LD1) in front of the illuminating device (10).

14. A motorcycle headlamp comprising at least one illumination device (10) according to claim 13.

15. A motorcycle headlamp comprising at least one primary optics (100) according to claim 1.

* * * * *